United States Patent [19]

Buttitta et al.

[11] Patent Number: 5,913,166
[45] Date of Patent: Jun. 15, 1999

[54] ARRANGEMENT FOR PROVIDING A CALL HAND-OFF FOR A MOBILE STATION FROM A LAND-LINE SUPPORTED PRIVATE BASE STATION TO A CELLULAR BASE STATION OPERATING IN A CELLULAR SYSTEM

[75] Inventors: Anthony Buttitta, Chicago, Ill.; Karen L. Hilton, Golden, Colo.; Muzibul H. Khan, Marlboro, N.J.

[73] Assignee: Lucent Technologies Inc., Murray Hill, N.J.

[21] Appl. No.: 08/580,107

[22] Filed: Dec. 29, 1995

[51] Int. Cl.$^6$ ............................................. H04Q 7/20
[52] U.S. Cl. ........................ 455/436; 455/444; 455/461; 455/552; 455/560
[58] Field of Search .................................. 455/422, 424, 455/426, 428, 429, 432, 435, 436, 438, 439, 442, 444, 446, 459, 462, 560, 552, 461, 433

[56] References Cited

U.S. PATENT DOCUMENTS

| | | | |
|---|---|---|---|
| 5,101,501 | 3/1992 | Gilhousen et al. | 455/442 |
| 5,127,042 | 6/1992 | Gillig et al. | 455/552 |
| 5,260,988 | 11/1993 | Schellinger et al. | 455/552 |
| 5,442,680 | 8/1995 | Schellinger et al. | 455/552 |
| 5,463,674 | 10/1995 | Gillig et al. | 455/552 |
| 5,566,236 | 10/1996 | MeLampy et al. | 455/560 |
| 5,664,005 | 9/1997 | Emery | 455/436 |
| 5,664,007 | 9/1997 | Samadi et al. | 455/442 |
| 5,745,852 | 4/1998 | Khan et al. | 455/433 |

OTHER PUBLICATIONS

PN–3474.1 (IS–136.1 Rev A), V & V Version, "TDMA Cellular/PCS—Radio Interface—Mobile Station—Base Station Compatibility—Digital Control Channel, Revision A," Nov. 17, 1995.

*Primary Examiner*—Dwayne D. Bost
*Assistant Examiner*—Nay A. Maung
*Attorney, Agent, or Firm*—S. R. Williamson

[57] ABSTRACT

A private wireless system is configured for providing a call hand-off capability for a mobile station communicating with a private base station operating in the wireless system. The call in the wireless system is handed off to the public cellular system whenever the mobile station is moved near the fringe of the coverage area provided by the private base station. Once the hand-off is initiated in the private base station, a process is executed in which the private base station and a local exchange carrier cooperatively switch an active call from an existing wireless communications path established between the private base station and the mobile station to a newly created wireless communications path established between the mobile station and a public base station in the cellular system.

29 Claims, 8 Drawing Sheets

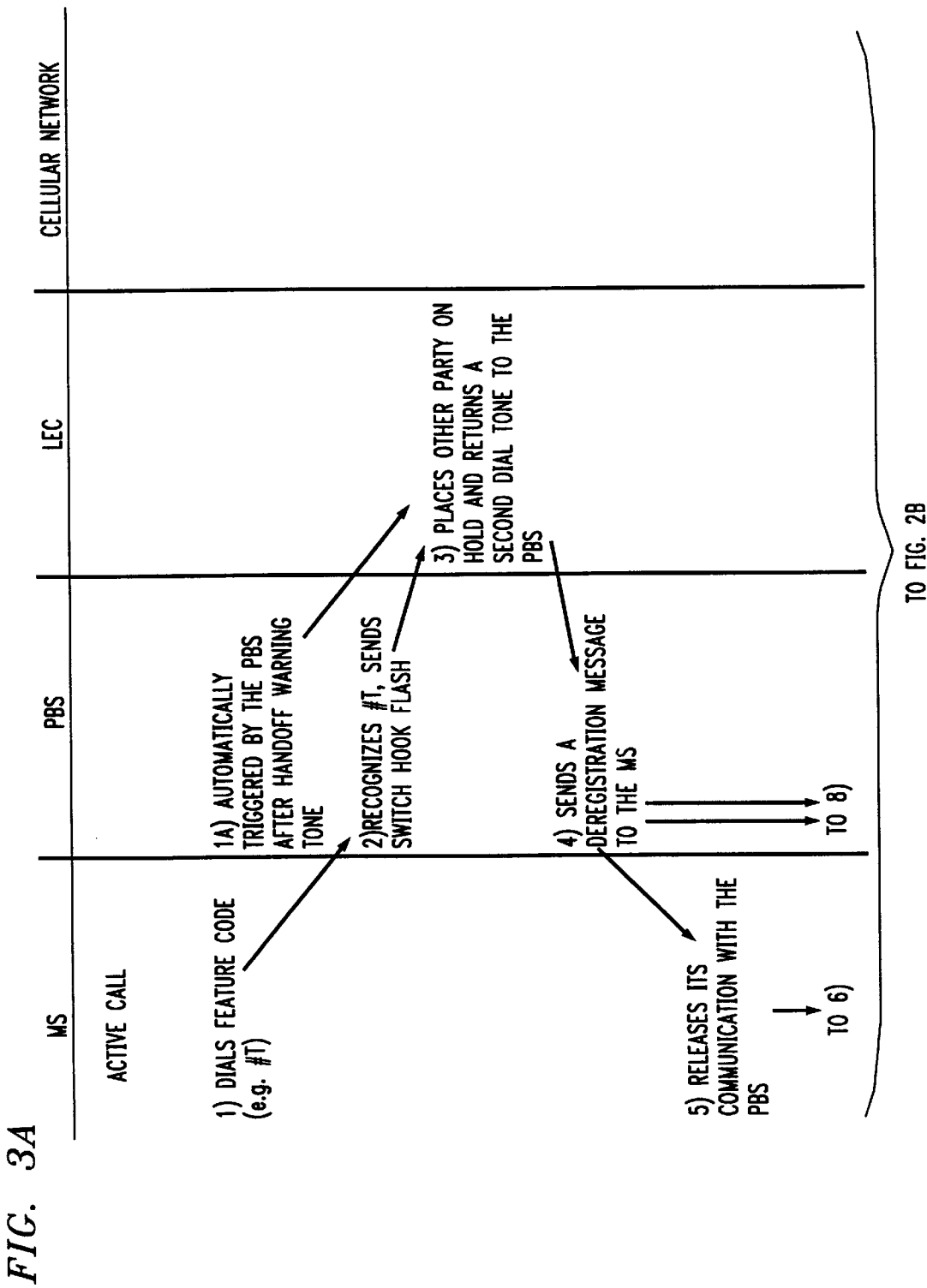

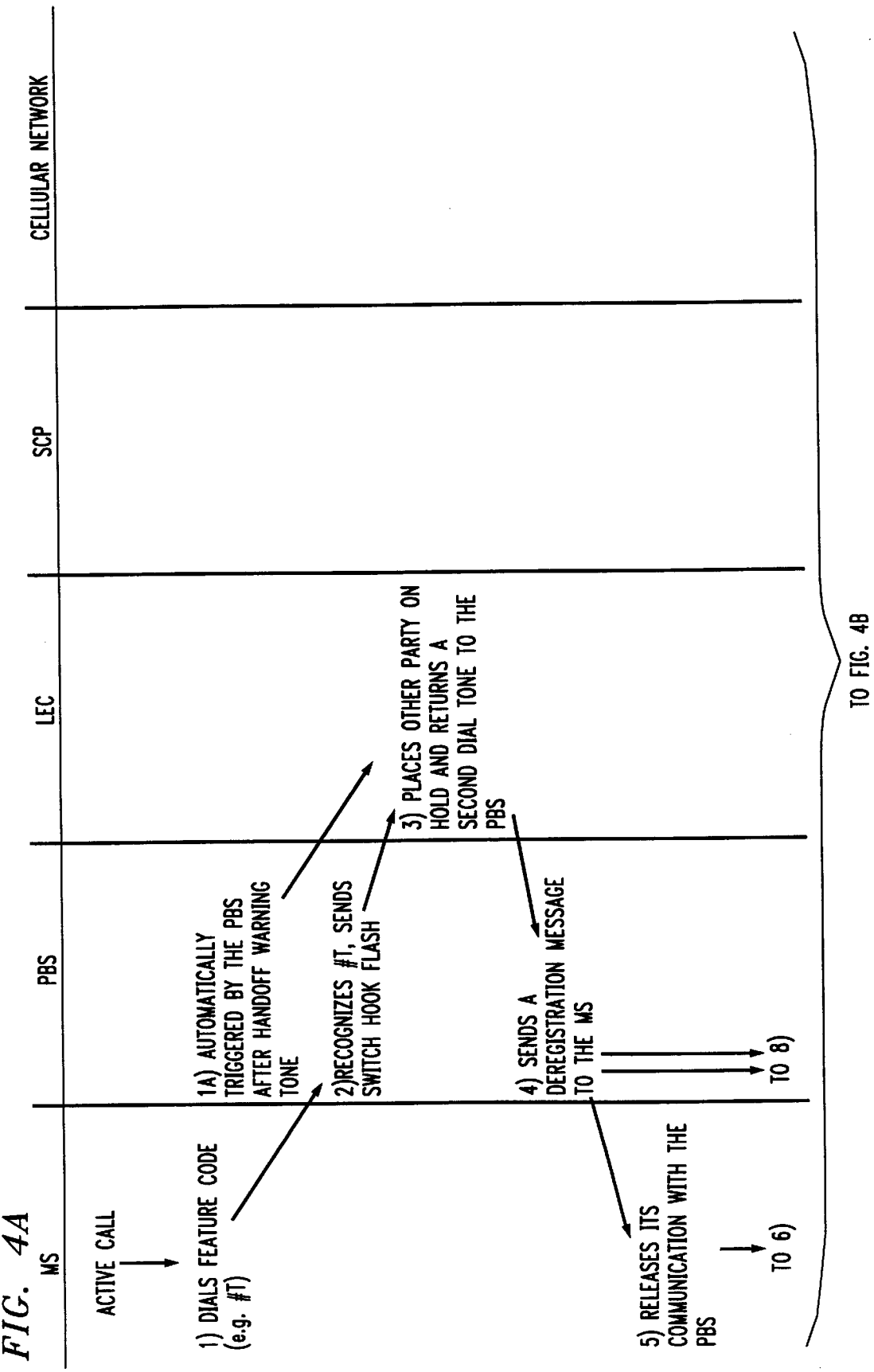

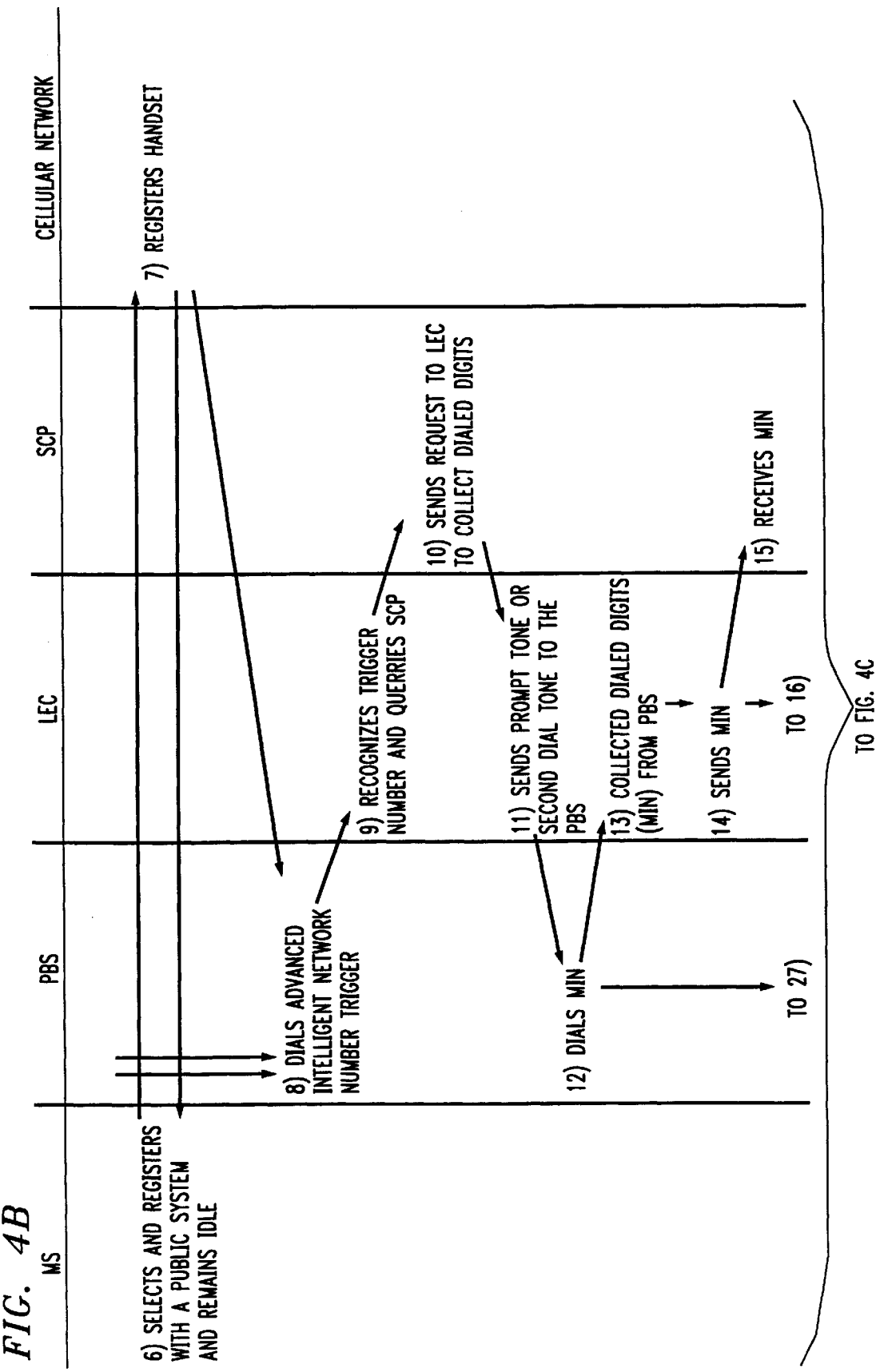

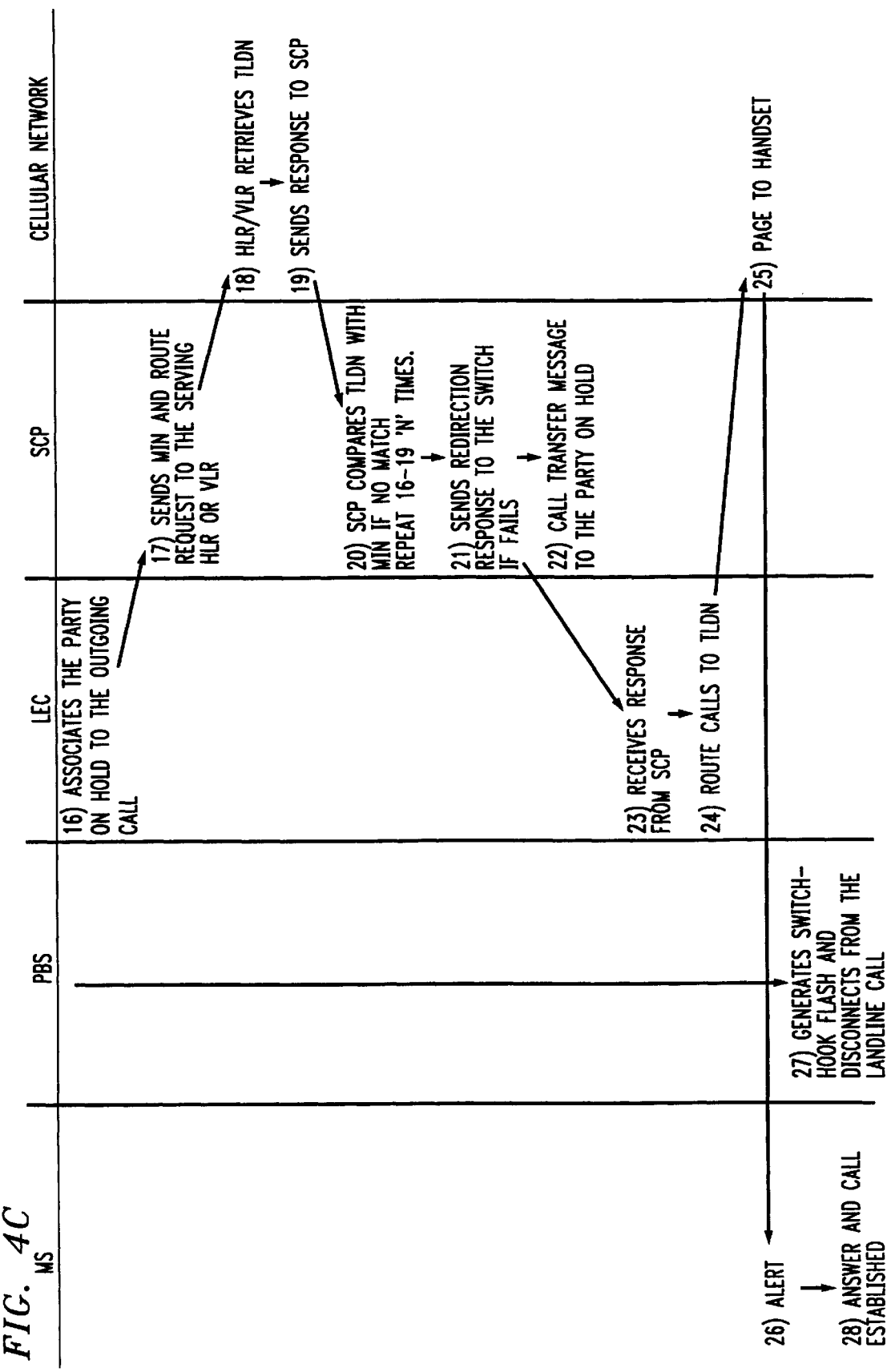

ARRANGEMENT FOR PROVIDING A CALL HAND-OFF FOR A MOBILE STATION FROM A LAND-LINE SUPPORTED PRIVATE BASE STATION TO A CELLULAR BASE STATION OPERATING IN A CELLULAR SYSTEM

BACKGROUND OF THE INVENTION

1. Technical Field

This invention relates generally to wireless radio telephones and, more particularly, to radio telephones operative with a private base station and public base stations in a wireless system.

2. Description of the Prior Art

With the growing popularity of mobile stations, which enables users to establish and maintain telephone communications almost anywhere, increased user flexibility in utilization of these mobile stations is desired. One approach to providing the increased user flexibility while also encouraging greater utilization of the mobile stations is by providing low-power private base stations as described in the Telecommunications Industry Association (TIA) Interim Standard (IS)-136, dated Nov. 17, 1995.

This standard defines a cellular radio interface specification and sets forth parameters through which a user may register his or her mobile station with a private base station. Once the user has registered the mobile station with the private base station, all telephone calls for this mobile station, outgoing as well as incoming, are routed through this private base station.

A private base station, which operates in accordance with the TIA IS-136 cellular radio interface specification, shares the same frequency spectrum with large cells in the public cellular system, but operates at a greatly reduced power level. Also, each private base station is connected to the public switched telephone network and has a land-line subscriber telephone number which allows a subscriber in the public cellular system to use his or her mobile station for making or receiving telephone calls through the public switched telephone network or other similar network that offers the local exchange service. One example of a land-line supported private base station is disclosed in copending and commonly assigned U.S. patent application Ser. No. 08/509, 403 which was filed on Jul. 31, 1995.

As set forth in the TIA IS-136 cellular radio interface specification, a mobile station is able to originate and receive telephone calls through a private base station so long as the mobile station is registered with the private base station and also remains within the coverage region of this private base station. Thus, if a user of the mobile station, while on a telephone c(all established through the private base station, moves the mobile station out of the coverage region for the private base station, in accordance with the TIA IS-136 cellular radio interface specification, the call is not handed off to the public cellular system. Even though the user is provided with audio tones notifying him or her that the mobile is approaching the outer limit of the private base station's coverage area, if the user takes no corrective measures and goes beyond the outer fringe of this coverage area, the call will be dropped.

The desired hand-off does not occur since the private base stations are not designed as nor meant to be connected as an integral part of the network of the public cellular system. One option that is available to the user of the mobile station is to terminate the call going through the private base station and reestablish contact with the remote party by using the mobile station to place a telephone call through the public cellular system. While this option may have been generally satisfactory in the past, it is now technically feasible and desirable to provide an arrangement for operation of a private base station through which a hand-off to the public cellular system may be achieved automatically as the mobile station is moved beyond the coverage region provided by the private base station.

SUMMARY OF THE INVENTION

In accordance with the present invention, an arrangement for configuring a private base station with a telephone call hand-off capability is provided. The private base station operates in a private wireless system and is configurable either to permit the user of a mobile station communicating with a remote party through the private base station to manually initiate the hand-off or have the private base station automatically execute the hand-off when the mobile station is moved in an area which is at the fringe of the coverage provided by the private base station.

In the execution of the hand-off, and in accordance with an aspect of the invention, the arrangement uses a third party call feature and either a call park feature or a conference bridge feature available in, for example, a switch at a local exchange carrier which connects the private base station to the public switched telephone network. Once the hand-off is initiated in the private base station, by either the user of the mobile station or automatically in the private base station, a process is executed in which the private base station and the switch at the local exchange carrier cooperatively switch a call in progress from an existing wireless communication path established between the private base station and the mobile station to a newly created wireless communication path established between a public base station in the cellular system and the mobile station.

BRIEF DESCRIPTION OF THE DRAWING

This invention and its mode of operation will be more clearly understood from the following detailed description when read with the appended drawing in which:

FIGS. 2, 3 and 4 show respectively first, second and third protocols of a call hand-off process which details how telephone communications are switched from a first path, which includes a wireless communications path between a mobile station and a private base station, to a second path, which includes a wireless communications path between the mobile station and a public base station, for maintaining the communications between the (mobile station and a remote telephone station, in accordance with the invention.

DETAILED DESCRIPTION

Figure 1:
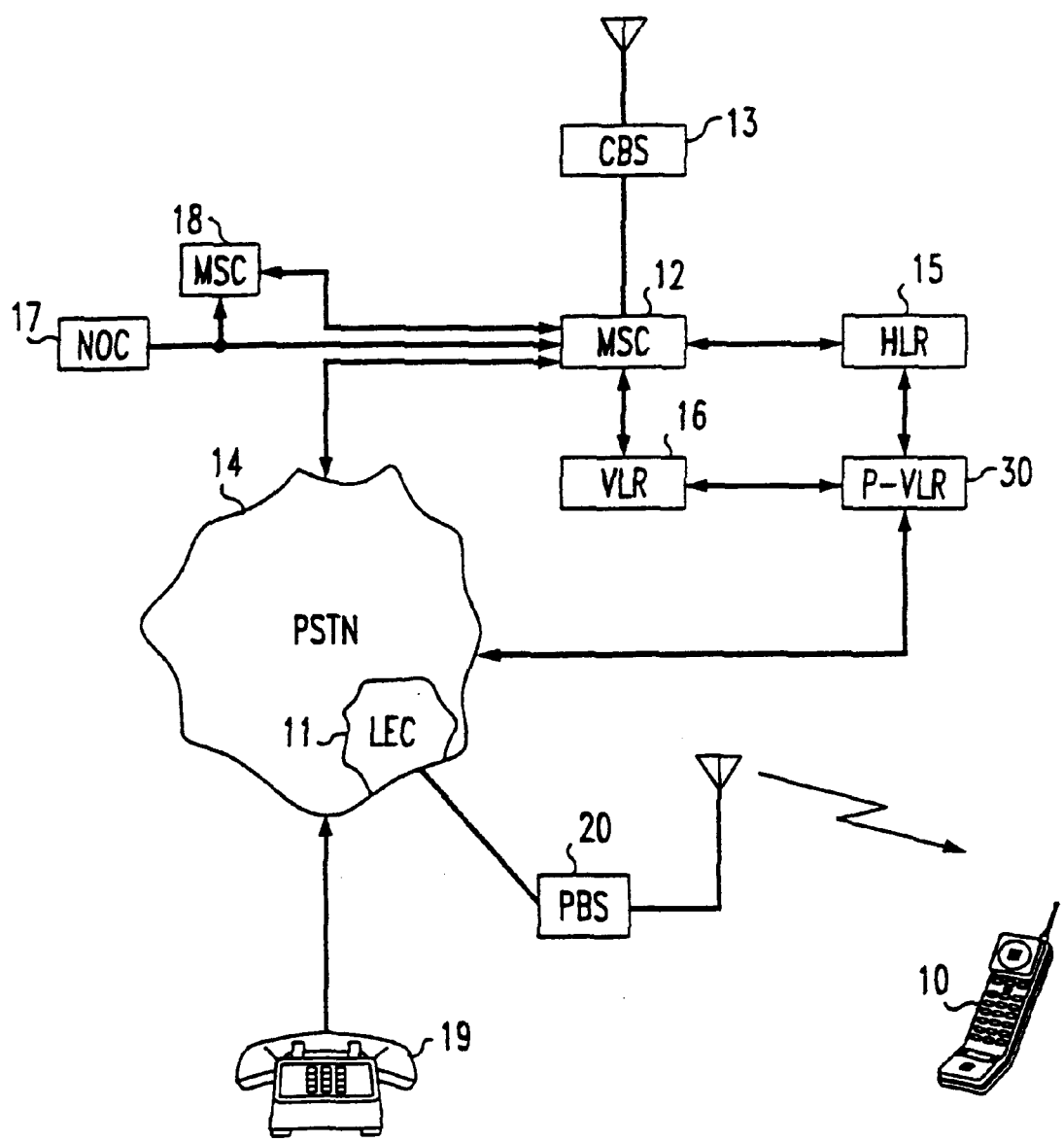
FIG. 1 shows a simplified block diagram of a cellular switching system, its logical entities as well as the relative connection with the public switched telephone network and a private base station.

Referring now to FIG. 1, there is shown a simplified block diagram of a cellular switching system, its logical entities as well as the relative connection with the public switched telephone network and a private base station. The cellular concept is well known and is described in general in the *Bell System Technical Journal*, Volume 58, Number 1, January 1979, and specifically in an article entitled *The Cellular Concept* by V. H. MacDonald, on pages 15 through 41 of this journal.

Included within the cellular switching system are a mobile station (MS) 10, mobile switching center (MSC) 12, the public switched telephone network (PSTN) 14, which includes a local exchange carrier (LEC) switch 11, a public or cellular base station (CBS) 13, a home location register (HLR) 15, a visiting location register (VLR) 16, and a private base station visiting location register (P-VLR) 30. In accordance with the Telecommunications Industry Association (TIA) Interim Standard (IS)-136, dated December 1994, a private base station (PBS) 20 is illustratively shown connected to the public telephone switched network 14 and communicates with mobile station 10 in a private wireless system defined by this standard. Also, a subscriber station telephone set 19 is illustratively shown connected to the public telephone switched network 14 in a well known manner.

In the operation of the private wireless system, the mobile station 10 is capable of originating and receiving telephone calls through the private base station 20 while this mobile station remains registered with this private base station. To maintain such registration, the mobile station 10 must remain turned ON and stay within the coverage area of the private base station 20.

While registered with the private base station 20, any incoming cellular telephone calls for the cellular subscriber i.e, the user of mobile station 10, will be automatically forwarded to the land-line number (LLN) for the private wireless system. This land-line number is the number recognized in the local exchange carrier switch 11 as being assigned to the private base station 20. Thus the user does not incur cellular call charges for these incoming calls. Similarly, the cellular subscriber's outgoing calls will be charged at the rate set by the local exchange carrier.

In the private wireless system disclosed herein, in accordance with the disclosed embodiment of the invention, an arrangement for configuring private base station 20 with a telephone call hand-off capability is provided. Multiple protocols for the embodiment are described in detail later herein. The private base station 20 and the local exchange carrier switch 11 cooperatively switch a call in progress from an existing wireless communication path established between private base station 20 and the mobile station 10 to a newly created wireless communication path established between public base station 13 in the cellular system and the mobile station 10.

The private base station 20 is configurable either to permit the user of mobile station 10, while communicating with a remote party, through this base station 20, to manually initiate the hand-off or to have base station 20 automatically execute the hand-off when mobile station 10 is moved to the fringe of the coverage area provided by private base station 20. Such hand-off is executed while the user of mobile station 10 is communicating with a remote party located at, for example, subscriber station telephone set 19.

The mobile switching center 12 is part of the overall cellular systems operation. For clarity, mobile switching center 12 is illustratively shown connected to mobile switching center 18 and network operation controller (NOC) 17. Like mobile switching center 12, mobile switching center 18 is part of the overall cellular systems operation and may similarly have an home location register, a visiting location register, a private base station visiting location register, as well as multiple cellular base stations associated therewith. It is understood that other mobile switching centers also may be part of the cellular system. The network operation controller 17 provides overall control and thereby ensures that the operation of the whole cellular system is supported and serviced.

The hand-off executed by private base station 20 may occur while a user at mobile station 10 is communicating with a remote party using a mobile station (not shown) located in the cellular system and served by either mobile switching center 12 or mobile switching center 18, for example. The remote party may also be using a private base station (not shown) that is associated either with the private base station visiting location register 30 or another private base station visiting location register (not shown) that is associated with, for example, mobile switching center 18.

The mobile switching center 12 performs all the switching functions related to call delivery and is interconnected to the public telephone switched network 14, the home location register 15, the visiting location register 16 and the cellular base station 13. The home location register 15 maintains a data base, profile record and call routing information or a pointer to the call routing information for all mobile stations in a particular assigned home area. The visiting location register 16 maintains a data base for call routing information or a pointer to the call routing information for those mobile stations which are visiting its assigned area of coverage.

The private base station visiting location register 30 performs the interface functions between a private base station, such as station 20, and both the home location register 15 and the visiting location register 16 for holding both call routing information and order of registered position information for mobile stations that are currently registered with the private base station. The private base station visiting location register 30 is also responsible for administering spectrum utilization and operations of the private base station 20. A private base station visiting location register suitable for use as register 30 is disclosed in copending and commonly assigned U.S. patent application Ser. No. 08/509,406 filed on Jul. 31, 1995.

The private base station 20 qualifies for private (or non-public) mode time-division-multiple-access (TDMA) cellular operation under the TIA IS-136 cellular radio interface, which permits a cellular mobile station to register with a private base station to receive or originate calls through a land-line connected to the public telephone switched network instead of through a cellular base station, such as cellular base station 13, connected in the regular public cellular system. Specifically, this radio interface provides the digital control channel in accordance with TIA IS-136.1 and the traffic channels and control channel in accordance with TIA IS-136.2 for communication with the mobile station.

The private base station 20 is limited to a very low level of transmitted power for restricting its coverage range to a relatively small area. This allows the private base station to reuse the same radio frequency spectrum used by the macro cellular systems as long as the frequency of use selected by the private base station is different from the cell for the regular public or macro cellular system in whose area of coverage the private base station is located. The operating frequency spectrum for the private base station is selected in a way that insures no interference to the macro cellular system. This is achieved by directing the private base station to perform channel scanning and interference measurements before selecting its operating frequencies. While operating in its normal mode awaiting receipt of an incoming call or an off-hook request from a registered mobile station, the private base station 20 continually broadcasts digital control channel information containing its identity and system parameters.

A TIA IS-136 compliant mobile station can search for a private base station's control channel transmission using a number of techniques. One of these may be based on the mobile station's prior knowledge of the private base station's existence. Another may be in response to a mobile station user manually directing the mobile station to search for the private base station. In yet another technique the mobile station, upon finding the control channel of the private base station, automatically goes through a series of controlled procedures to obtain registration with the private base station.

Once a mobile station, for example, station 10, obtains a successful registration with the private base station 20, the private base station 20 makes a modem connection to the private base station visiting location register 30 to update the mobile station's temporary listed directory number (TLDN). The temporary listed directory number in this case is the private base station's land-line number (LLN). Hence, when an incoming call is directed to a particular mobile station, information including the temporary listed directory number for this mobile station is accessed from the private base station visiting locating register 30 through the home location register 15 or the visiting location register 16 and the call is routed to the private base station's LLN. It is also understood that the temporary listed directory number may be stored in either the home location register 15 or the visiting location register 16, and the mobile switching center 12 then accesses this TLDN from this register. The private base station 20 detects the ring for an incoming call and sends an alerting signal or page to the registered mobile station. Following the mobile station's response to the alerting signal, private base station 20 establishes a traffic channel for the mobile station and generates an off-hook condition to connect the incoming call through the private base station to the mobile station.

The cellular user is provided with a visual notification in the mobile station 10 when this station is registered with the private base station 20 in the private wireless system. The mobile station features while in the private wireless system are advantageously arranged to be very similar to those available while operating in the public cellular system for providing convenience and case of use for the user. Such features are easily incorporated in a cellular telephone interface such as is described in U.S. patent application entitled "Streamlined User Interface For A Wireless Telephone," commonly assigned herewith and filed on Nov. 15, 1995 on behalf of J. W. Davidson et al. Similarly, these features are easily incorporated in a cellular telephone such as AT&T's portable cellular phone model 3770.

Figure 2A:
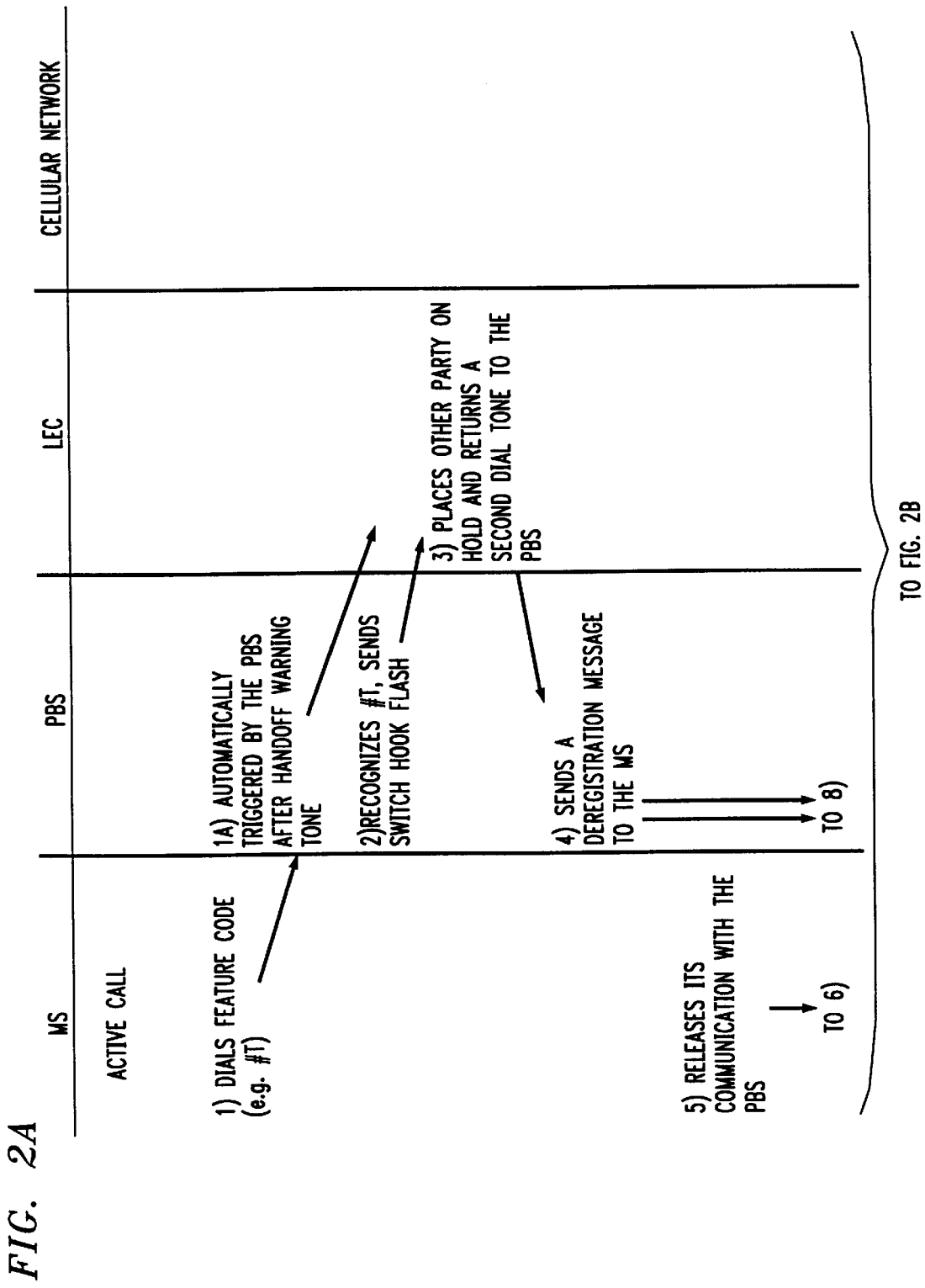
Figure 2B:
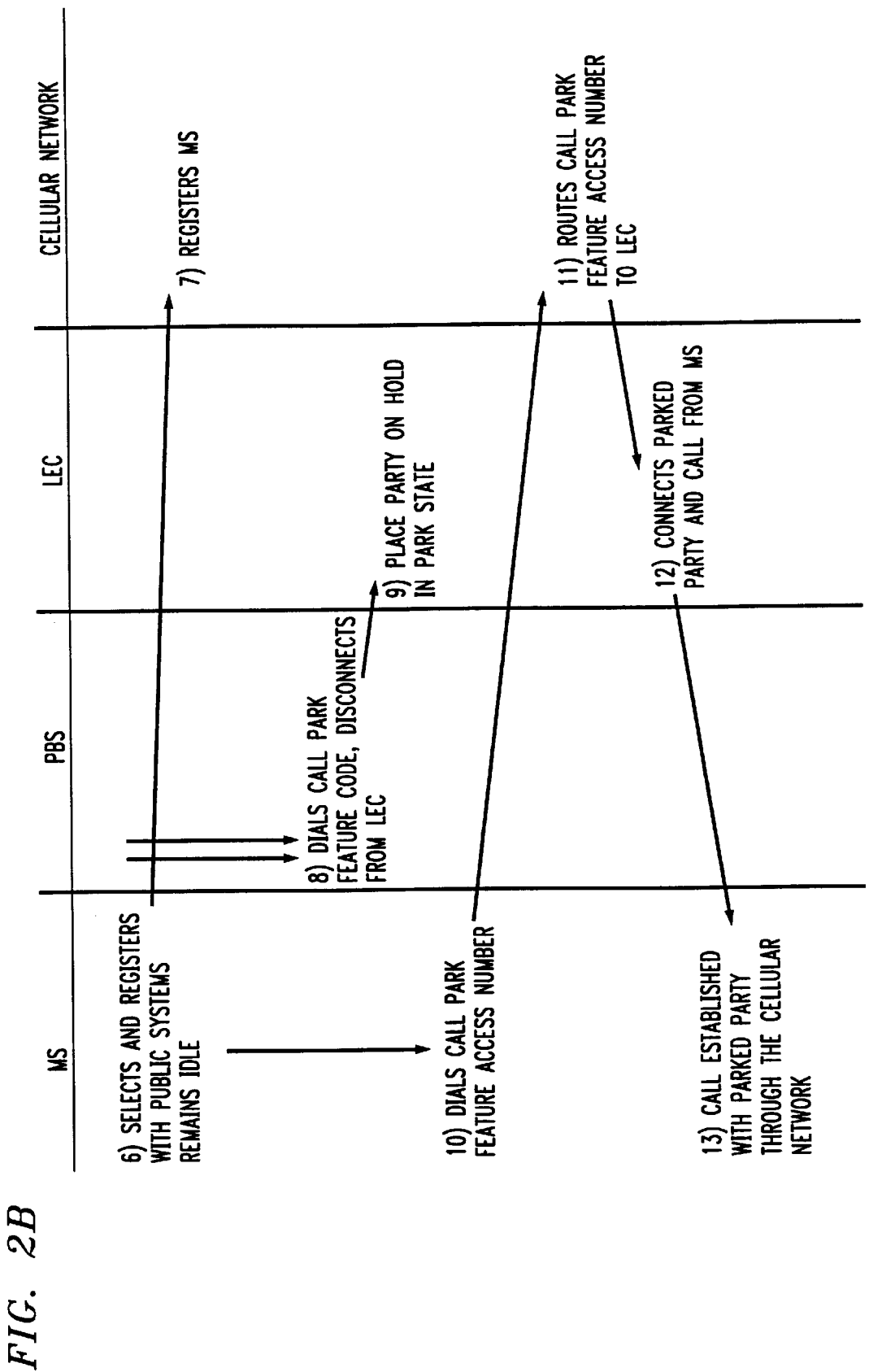

FIG. 2 shows a first protocol of a call hand-off process for handing-off an active call from the private wireless system to the public cellular system with minimal disruption to the parties conversing in the call. In the execution of the process, telephone communications are switched from a first path, which includes a wireless communications path between the mobile station 10 and the private base station 20, to a second path, which includes a wireless communications path between the mobile station 10 and the public base station 13, for maintaining the communications between the mobile station and a remote telephone station.

In the execution of the hand-off of telephone communications occurring in the mobile station from the private base station 20 to the cellular base station 13, in accordance with the first described protocol of the embodiment of the invention, the arrangement uses third party call and call park features presently available on a 5ESS® electronic switch manufactured by AT&T Corp. The 5ESS electronic switch is well known and is described in general in the *AT&T Technical Journal*, Volume 64, Number 6, Part 2, July–August 1985. The 5ESS electronic switch may easily function as the local exchange carrier switch 11, and thereby provide access for the private base station 20 to the public switched telephone network 14.

Available on most local exchange carrier switches, the third party call feature, like three-way calling, permits a subscriber at a first telephone to send a switch-hook flash signal to the local exchange carrier switch for placing the other party to the call in progress on hold in the switch and obtaining dial tone at the telephone. In the application of the third party call feature, the subscriber at the first telephone is able to make a telephone call to a second telephone number while leaving the other party to the call on hold.

The call park feature is invoked by a code transmitted to the switch 11 from the private base station 20. This feature is described in detail in, for example, AT&T's *5ESS Switch Business and Residence Custom Services Feature Descriptions*, Document Number 235-190-101, Issue 5, dated November 1993, pages 8–92 through 8–107. By way of general operation, the call park feature simply provides a way for a subscriber at a first telephone connected to the switch 11 to place a remote party to a conversation on hold in the switch, disconnect from the call, and then from a different telephone reconnect to the party placed on hold by dialing an appropriate call park feature access code recognized by the switch.

In order to achieve the hand-off operation, the call park feature is first set up in the switch 11 for the private base station 20. This feature may be provided, by way of example, either as part of the service provided by the provider of the private base station or alternatively, the base station owner may request to be provided with this feature. Once available, the feature is accessed by the base station 20 over the subscriber line connecting this base station to the switch 11. Both a call park feature code and a call park access or retrieval number may be obtained from the switch 11 by the base station 20.

The base station is suitably programmed with the call park feature code necessary to place a remote party on hold in a parked state in the switch 11. And the call park feature access number can be provided by the base station 20 to the mobile station 10 during communications with this mobile station (e.g., this number could be a dedicated number obtained from the switch 11), or alternatively the mobile station user may already have the knowledge of this number through the service provider (e.g., this number could be a universal call park access number for use at switch 11). Thus the mobile station 10 is also suitably programmed with the call park feature access number (either the dedicated number or the universal call park access number) for later use by this mobile station. Also, it is possible that the mobile station be allowed to use an abbreviated universal feature access number which when dialed by the mobile station will be mapped by the mobile switching center 12 to the appropriate feature access number for the switch 11 where the call has been parked. This mapping and routing of the call to the proper feature access number can be accomplished by using the mobile station's registration information along with the private base station visiting location register 30.

For security purposes, a personal identification number (PIN) may be transmitted to the switch 11 by the base station 20 during the process when the base station 20 dials the call park feature code to park a call. This PIN is then stored by the switch 11 and required to be again provided by the mobile station 10 before access to the party on hold is granted to this mobile station as it calls through the cellular network. The PIN may advantageously be the assigned MIN for mobile station 10 which is provided to the switch 11 at the same time that the call park feature code is dialed by the base unit 20 during the execution of the hand-off process, described later herein. Thus, when the mobile station 10 accesses the switch 11, it can use its MIN to gain access to and reconnect to the party placed on hold. Also, it is possible that mobile switching center 12 can pass on to switch 11 the calling number ID of the mobile station which will automatically be used as the PIN. This will eliminate the need of sending the PIN separately by the mobile station.

As long as the user of the mobile station 10 remains well within the coverage area of the private base station 20, communication remains satisfactory and no hand-off of communications is necessary or performed. Once the user of the mobile station 10 moves near the fringe of the private base station coverage area, however, the private base station 20 sends a warning tone to the mobile station user. If the user still continues to move further out of the private base station coverage area and the private base station is suitably configured, an impending hand-off tone is sent to the user from the private base station and the mobile station hand-off process is executed. Otherwise, the user dials a feature code to start execution of the mobile station hand-off process.

Once the hand-off is initiated in the private base station 20, by either the user of the mobile station 10 or automatically in the private base station, the process is executed in which the private base station and the local exchange carrier switch 11 collectively switch the call in progress from an existing wireless communications path established between the private base station and the mobile station to a newly created wireless communications path established between a cellular base station, such as cellular base station 13, in the cellular system and the mobile station 10.

The execution of the hand-off process is conveniently described in the following steps, which may be more easily understood when read in conjunction with the flowchart shown in FIG. 2.

1) From an active call the user presses a feature code (e.g. #T). This sends to the PBS a hand-off trigger.
1a) The PBS detects low signal strength from the MS and sends to the MS hand-off warning tones, after which the PBS proceeds with the following process.
2) The PBS sends a switch-hook flash to the LEC.
3) The LEC places the other party on hold and returns a dial tone to the PBS.
4) The PBS sends a deregistration message to the MS.
5) The MS ceases communications with the PBS and releases its channel.
6) The MS selects and registers With the public cellular system. The registration with the public system will automatically update the MS's Temporary Listed Directory Number (TLDN) with the corresponding HLR/VLR.
7) The public cellular system accepts the MS registration.
8) After step 4, the PBS sends a call park feature code in order to invoke the call park feature and optionally a PIN at the LEC.
9) The LEC places the other party on hold into the parked state.
10) The MS dials the call park feature access number over the cellular network.
11) The cellular network routes the call park feature access number to the LEC.
12) The LEC connects the parked party and the call from the MS.
13) The call with parked party is established with MS through cellular network.

The entire hand-off process for the mobile station may be achieved within 5 seconds. This time is subject to the number of digits that are transmitted to the switch 11 by both the private base station 20 as well as the mobile station 10 during the hand-off process. The hand-off may be achieved in less time, for example, if the PIN and/or MIN are not provided to the switch 11.

Although numerous switches presently available in the art serve as the LEC switch 11, many do not have a call park capability. Nevertheless, it is possible to achieve a call hand-off for a private wire ess system which has a private base station connected to a switch without such feature.

In the execution of the hand-off of the mobile station from the private base station 20 to the cellular base station 13, in accordance with a second described protocol of the embodiment, the arrangement uses third party call and conference bridge features available at the local exchange carrier switch 11. This switch 11 also provides access for the private base station 20 to the public switched telephone network 14.

Available on most local exchange carrier switches, the conference bridge feature permits a subscriber at a telephone to conference an additional party into an existing conversation in the local exchange carrier switch by using, for example, the third party call feature for dialing an additional telephone number and then bridging a party associated with a first call and the additional party associated with this second call together. In the application of the conference bridge feature, in accordance with the disclosed embodiment, the subscriber at the telephone is able to disconnect from the conference bridge and have the other parties remain connected in the switch.

Although the hand-off process will not be instantaneous as it appears to a user in a public cellular system using this second described protocol, nevertheless, it will be reasonably fast. Moreover, the private base station user can notify the other party of the impending short interruption after receiving the hand-off tone in the mobile station.

Figure 3B:
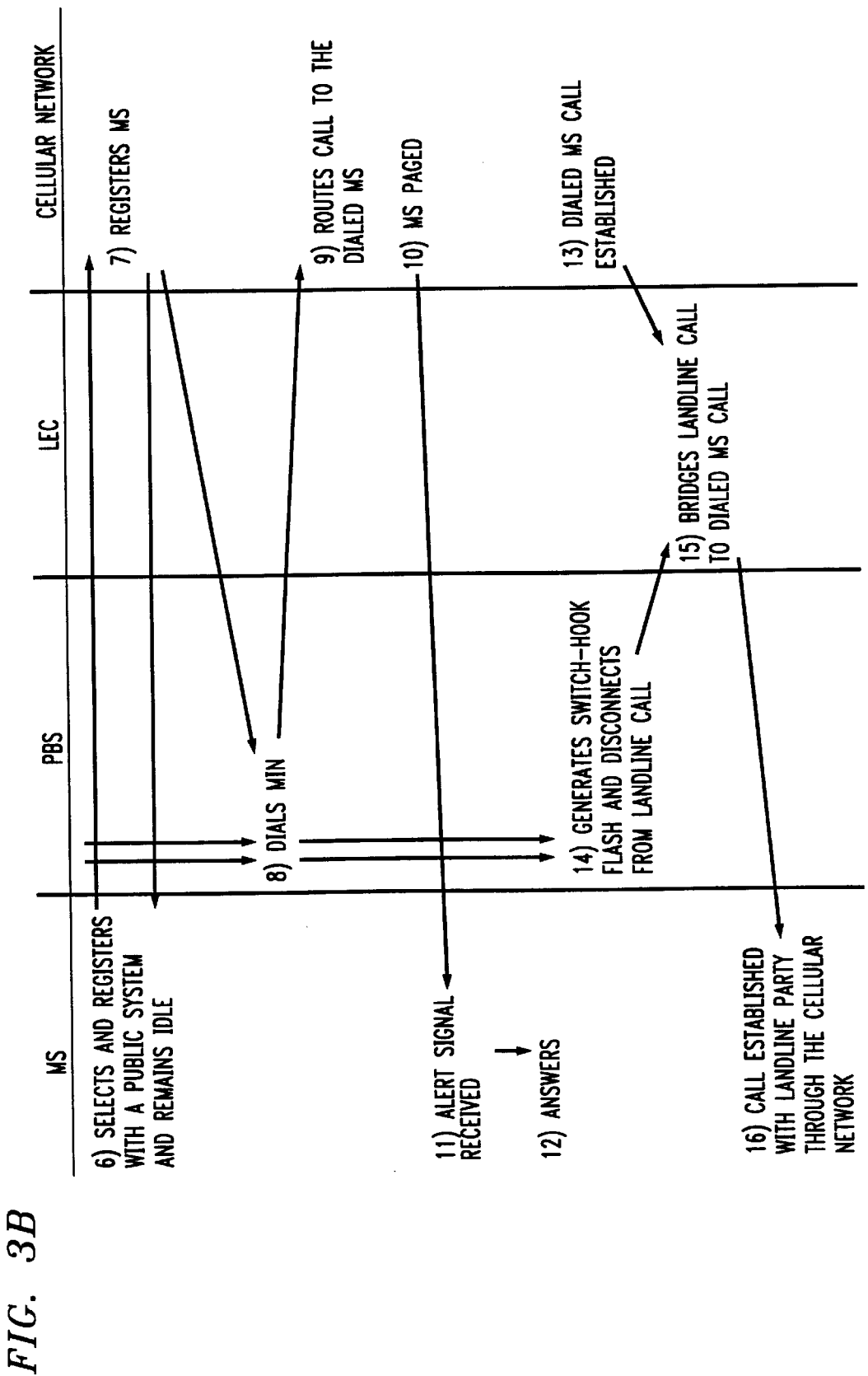

The execution of the hand-off process is conveniently described in the following steps, which may be more easily understood when read in conjunction with the flowchart shown in FIG. 3.

1) From an active call the user presses a feature code (e.g. #T). This sends to the PBS a hand-off trigger.
1a) The PBS detects low signal strength from the MS and sends to the MS station the hand-off warning tones, after which the PBS proceeds with the following process.
2) The PBS sends a switch hook flash to the LEC.
3) The LEC places the other party or land-line call on hold and returns a dial tone to the PBS.
4) The PBS sends a deregistration message to the MS.
5) The MS ceases communications with the PBS and releases its channel.
6) The MS selects and registers with the public cellular system and remains in the idle mode. The registration with the public system will automatically update the MS's Temporary Listed Directory Number (TLDN) with the corresponding HLR/VLR.
7) The public cellular system accepts the MS registration.
8) After step 4, the PBS dials the Mobile Identification Number (MIN) of the MS to place a call to the MS through the cellular network.

9) The cellular network routes the call to the MS.

10) The MS is then paged.

11) The user at the MS receives the page alert signal.

12) The user of the MS answers.

13) The cellular network is updated that the MS call is established.

14) After step 8, the PBS delays a sufficient time, typically 5 seconds, to allow the MS call to be established throughout the cellular network and then generates a switch-hook flash. Before generating the switch-hook flash, the PBS may detect audible ring tone and then ring tone ceasing to confirm that the call has been established with the MS. The PBS then disconnects.

15) The LEC bridges the land-line call to the dialed MS call.

16) The MS user is able to converse with the land-line party through the cellular network.

In the execution of the hand-off of the mobile station from the private base station 20 to the cellular base station 13, in accordance with a third described protocol of the embodiment, the arrangement employs third party call and conference bridge features available at the local exchange carrier switch 11. In addition, a service control point (SCP) in an advanced intelligent network (AIN) is also employed in the execution of the hand-off process. The SCP is an intelligent network service platform offered as an integral part of the AT&T Corp. Intelligent Network family of products and services. The SCP is generally described in a marketing document entitled *AT&T A-I-Net Service Control Point (SCP), Powerful and Reliable Service Platform for Intelligent Networks*, dated 1995.

The execution of the hand-off process is conveniently described in the following steps, which may be more easily understood when read in conjunction with the flowchart shown in FIG. 4.

1) From an active call the user presses a feature code (e.g. #T). This sends to the PBS a hand-off trigger.

1a) The PBS detects low signal strength from the MS and sends to the MS the hand-off warning tones, after which it proceeds with the following process.

2) The PBS sends a switch hook flash to the LEC.

3) The LEC places the other party or land-line call on hold and returns a dial tone to the PBS.

4) The PBS sends a deregistration message to the MS.

5) The MS ceases communications with the PBS and releases its channel.

6) The MS selects and registers with the public cellular system and remains in the idle mode. The registration with the public system automatically updates the MS's Temporary Listed Directory Number (TLDN) with the corresponding HLR/VLR.

7) The public cellular system accepts the MS registration.

8) After step 4, the PBS dials a number that is assigned an AIN Dialed Number Trigger.

9) The LEC recognizes the AIN trigger number and queries the SCP.

10) The SCP recognizes the AIN trigger number and sends a request to the LEC to collect dialed digits.

11) The LEC sends either a prompt tone or a second dial tone to the PBS. This is a prompt to the PBS to dial the digits of the MIN for the MS.

12) The PBS then dials the MIN of the MS to place a call to this MS through the cellular network.

13) The LEC collects the dialed digits (MIN) from the PBS.

14) The LEC sends the dialed MIN.

15) The SCP receives the dialed MIN.

16) The LEC associates the party on hold with the outgoing call for routing this party on hold to the MS via the cellular network.

17) The SCP sends the dialed MIN and routing request to the serving HLR or the VLR of the MS.

18) The HLR/VLR receives routing request and retrieves the TLDN.

19) The HLR/VLR sends a response back to the SCP.

20) The SCP compares the received TLDN with the MIN. If the received TLDN does not match the MIN, an allowance is made for the possibility that the MS has not been able to register with the cellular network anc repeats steps 17 to 20. These steps are cycled through only 'N' times to prevent unnecessary delays. N is typically 3, i.e. 3 attempts with interval of 2 secs.

21) If a favorable TLDN is received within N attempts, the SCP sends a redirection response to the LEC and proceeds to step 23.

22) If a favorable TLDN is not received within N attempts, a message (e.g. call transfer failed) is played to the party on hold.

23) The LEC receives the response from the SCP.

24) The LEC routes the call to the TLDN.

25) The MS is paged.

26) The user receives the page alert.

27) The PBS generates a switch-hook flash and disconnects from the land-line call.

28) The user answers and is able to converse with the party on hold.

While the foregoing invention has been described in terms of the above embodiment, and protocols for this embodiment, it will be readily apparent to those skilled in the art that various modifications can be made. For example, a private wireless system which supports two land lines may be employed for providing a hand-off capability. In such a system, while the remote party is on hold, the system may initiate a second call through the land-line to the mobile station's cellular number and then bridge the call internally. Accordingly, such modifications are contemplated as being within the knowledge of one skilled in the art and may be utilized without departing from the spirit and scope of the claimed invention.

We claim:

1. A private wireless system arranged for providing a call hand-off for a mobile station operable in said wireless system for communicating with a remotely located telephone station, the system comprising:

a private base station for providing wireless communications with said mobile station;

means for switching telephone communications from a first communication path to a second communication path for maintaining communications between the mobile station and the remote telephone station, said first communication path including a telephone subscriber line connected to said private base station and a first wireless communication path established between said mobile station and said private base station, and said second communication path including a wireless communication path established between said mobile station and a public base station; and said private base station initiates said call hand-off by sending a switch-hook flash to the means for switching telephone communications and a deregistration message to the mobile station.

2. The private wireless system of claim 1 wherein said switching means includes a local exchange carrier switch connected to said subscriber line.

3. The private wireless system of claim 2 wherein said local exchange carrier switch, responsive to said switch-hook flash, executes a third party feature by placing an other party to the active call on hold and returning a dial tone to the private base station.

4. The private wireless system of claim 3 wherein said local exchange carrier switch includes a call park feature used in executing said call hand-off.

5. The private wireless system of claim 3 wherein said mobile station, responsive to receipt of said deregistration message, ceases communicating over said first wireless communication path and begins communicating in a cellular network over said second wireless communication path.

6. The private wireless system of claim 5 wherein said private base station sends a call park feature code to the local exchange carrier switch for activating said call park feature, and the exchange carrier switch, responsive to receipt of said code, places the other party to the active call in a parked state.

7. The private wireless system of claim 6 wherein said mobile station dials a call feature access number for establishing a connection over said second communication path, said cellular network routing said access number to the local exchange carrier switch.

8. The private wireless system of claim 7 wherein said local exchange carrier switch, responsive to receipt of said access number, connects said other party to the active call and the incoming call received over said second communication path together for permitting conversation, said second communication path further including a communication line between the public base station and the local exchange carrier switch.

9. The private wireless system of claim 3 wherein said local exchange carrier switch includes a conference bridge feature used in executing said call hand-off.

10. The private wireless system of claim 'wherein said mobile station, responsive to receipt of said deregistration message, ceases communicating over said first wireless communication path and registers in a cellular network over said second wireless communication path.

11. The private wireless system of claim 10 wherein said private base station sends an identification number for the mobile station to the local exchange carrier switch for routing an outgoing call through the cellular network to said mobile station.

12. The private wireless system of claim 11 wherein said local exchange carrier switch, upon receipt of the identification number, routes the outgoing call to the mobile station using said identification number.

13. The private wireless system of claim 12 wherein said cellular network routes the outgoing call to the mobile station and generates a page signal to said mobile station, said mobile station responding to said page signal and establishing said second communication path.

14. The private wireless system of claim 13 wherein said private base station generates a second switch-hook flash for activating said conference bridge feature in said local exchange carrier switch for bridging said other party and said mobile station together over said second communication path, said second communication path further including a communication line between the public base station and the local exchange carrier switch.

15. A private wireless system arranged for providing a call hand-off for a mobile station operable in said wireless system for communicating with a remotely located telephone station, the system comprising:

a private base station for providing wireless communications with said mobile station; and means for switching telephone communications from a first communication path to a second communication path for maintaining communications between the mobile station and the remote telephone station, said first communication path including a telephone subscriber line connected to said private base station and a first wireless communication path established between said mobile station and said private base station, and said second communication path including a wireless communication path established between said mobile station and a public base station, and said switching means further include a service control point in an advanced intelligent network, said service control point being operably connected to a local exchange carrier switch and the cellular network and used to execute said call hand-off.

16. The private wireless system of claim 15 wherein said private base station sends an identification number for the mobile station to the service control point for routing an outgoing call through the cellular network to said mobile station.

17. The private wireless system of claim 16 wherein said service control point, upon receipt of the identification number, routes the outgoing call to the cellular network using said identification number.

18. The private wireless system of claim 17 wherein said cellular network routes the outgoing call to the mobile station and generates a page signal to said mobile station, said mobile station responding to the page signal and establishing said second communication path.

19. The private wireless system of claim 18 wherein said service control point connects said other party in said local exchange carrier switch and said mobile station together over said second communication path, said second communication path further including a communication line between the public base station and the local exchange carrier switch via the service control point.

20. A method of providing a call hand-off for a mobile station operable in a private wireless system for communicating with a remotely located telephone station, the method comprising the steps of:

providing wireless communications in a private base station for communicating with said mobile station;

switching telephone communications from a first communication path to a second communication path for maintaining communications between the mobile station and the remote telephone station, said first communication path including a telephone subscriber line connected to said private base station and a first wireless communication path established between said mobile station and said private base station, and said second communication path including a wireless communication path established between said mobile station and a public base station; and initiating said call hand-off by sending a switch-hook flash to a switching means and a deregistration message to the mobile station.

21. The method of claim 20 wherein said switching step includes the step of providing a local exchange carrier switch connected to said subscriber line.

22. The method of claim 21 wherein said remotely located telephone station is connected to said local exchange carrier switch.

23. The method of claim 21 wherein said local exchange carrier switch includes a third party call feature.

24. The method of claim 23 wherein said local exchange carrier switch includes a call park feature.

25. The method of claim 23 wherein said local exchange carrier switch includes a conference bridge feature.

26. The method of claim 20 wherein said switching step further include the step of providing a service control point in an advanced intelligent network.

27. In a private wireless system, a private base station arranged for providing a call hand-off for a mobile station operable in said wireless system for communicating with a remotely located telephone station, the system including a local exchange carrier switch for switching telephone communications from a first communication path to a second communication path for maintaining communications between the mobile station and the remote telephone station, said first communication path including both a telephone subscriber line connected between said private base station and said local exchange carrier switch and a first wireless communication path established between said mobile station and said private base station, and said second communication path including a wireless communication path established between said mobile station and a public base station, the private base station comprising:

means for providing wireless communications with said mobile station; and means for initiating said call hand-off by sending both a switch-hook flash to the local exchange carrier switch and a deregistration message to the mobile station.

28. The private base station of claim 27 including means for sending a call park feature code to the local exchange carrier switch for activating a call park feature available at said switch.

29. The private base station of claim 27 including means for sending an identification number for the mobile station to a service control point in an advanced intelligent network for routing an outgoing call through the local exchange carrier switch and the advanced intelligent network to said mobile station.

* * * * *